United States Patent [19]

Sigl et al.

[11] Patent Number: 4,760,893
[45] Date of Patent: Aug. 2, 1988

[54] METHOD OF CONTROLLING SLIPPING OR SPINNING OF A VEHICLE WHEEL

[75] Inventors: Alfred Sigl, Sersheim; Thomas Isella, Waldbronn, both of Fed. Rep. of Germany

[73] Assignee: Robert Bosch GmbH, Stuttgart, Fed. Rep. of Germany

[21] Appl. No.: 921,325

[22] Filed: Oct. 17, 1986

[30] Foreign Application Priority Data

Oct. 22, 1985 [DE] Fed. Rep. of Germany ....... 3537452

[51] Int. Cl.⁴ .......................... B60K 31/00; B60T 8/08
[52] U.S. Cl. .................................... 180/197; 303/109; 364/426
[58] Field of Search ................. 180/197; 303/92, 109; 364/426

[56] References Cited

U.S. PATENT DOCUMENTS 4,186,331 1/1980 de Buhr ............................. 303/109
4,360,918 11/1982 Ruhnau et al. ...................... 303/92
4,468,740 8/1984 Beck et al. ......................... 303/92

Primary Examiner—John A. Pekar
Attorney, Agent, or Firm—Frishauf, Holtz, Goodman & Woodward

[57] ABSTRACT

To prevent slipping or spinning of a driven wheel which, selectively, can be braked or supplied with reduced torque from a vehicle engine, a reference speed is determined against which slipping or tendency to slip is measured. The reference value for slip measuring, derived from non-driven or rolling wheels, is tested for physically impossible conditions and, if such physically impossible conditions obtain, they are disregarded when determining slipping or tendency to slip. Proper speed values can be stored, utilized for subsequent measurement, directly or modified, which may also be made speed dependent, or dependent on differences between the speeds of two rolling wheels.

21 Claims, 3 Drawing Sheets

METHOD OF CONTROLLING SLIPPING OR SPINNING OF A VEHICLE WHEEL

The present invention relates to controlling slipping or spinning of a wheel of a vehicle, and more particularly to sensing a tendency of a driven wheel to slip or spin by comparing the speed of the driven wheel with a reference speed derived from vehicle speed or the speed of at least one rolling or non-driven wheel.

BACKGROUND

Control systems to prevent slipping or spinning of wheels are known; in some such systems, a driven wheel on which a tendency to slip or spin, or actual spinning, is sensed is braked and/or the drive torque of the vehicle is controlled to decrease the torque applied at least to the specific wheel, typically by reducing output torque from the engine. A control system of this kind is described in German Patent Disclosure Document DE-OS No. 31 27 302. In accordance with this disclosure, a wheel is braked if the wheel has a tendency to spin or slip; additionally, upon sensing a tendency of two driven wheels to spin or slip, a control signal is generated which reduces the torque output of the engine. The tendency to spin or slip is sensed by comparing speed signals or acceleration signals of the driven wheels with reference signals and, if a certain limiting or threshold value is exceeded, a tendency to slip or spin is indicated. The slip signals are obtained by comparing wheel speeds of the driven wheels with wheel speeds of non-driven or rolling wheels. As an equivalent, the wheel speed of the rolling wheels is averaged to obtain an average speed signal or, rather, a derived speed signal. The averaged or the derived speed signal is then used as a reference value or a reference speed with which the speed of the driven wheel, or driven wheels, is, or are, compared.

Under some conditions, the rolling wheels may operate at speeds, or be subjected to rotation which is not representative of vehicle speed, so that the reference is distorted.

THE INVENTION

It is an object to improve a method of controlling slip, and a slip control system, in which erroneous response of a slip controller is effectively eliminated; such erroneous response may occur, for example, by interference with the speed of one or both of the rolling wheels, for example sudden impacts, passage of a rolling wheel through a pothole, or the like.

Briefly, the speed of at least one of the rolling wheels is monitored and an output signal representative of the monitored speed is obtained. This signal is tested to determine if the signal has characteristics indicative of a change in speed of the wheel which is not physically possible; and, if the test indicates a condition that the signal is representative of a physically impossible condition, the signal used as a comparison signal for the driven wheels is modified, so as to compensate for distortion of the rolling wheel signal.

It is possible to check either the speed of a rolling wheel, or rolling wheels, at predetermined temporal intervals, and to compare succeeding signals. The rate of change in speed—acceleration or deceleration—can then be measured, and the acceleration and deceleration values can be compared with predetermined limited values, which predetermined limits can be set to exclude physical impossible conditions. Physically impossible conditions, for example, are changes in speed which, in a rolling wheel of a motor vehicle on a road, is greater than about +0.6 g. Upon decleration, without braking, an absolute threshold below about −0.3 g is also an impossible condition.

If the occurrence of a physically impossible condition is determined, then the reference signal which is used is either the previously obtained possible reference signal or the previously obtained possible reference signal is changed; or the introduction of the change in the reference speed is delayed, for example by a delay filter by, for example, 0.3 second.

Additionally, or in lieu of the foregoing, it is possible to obtain a predetermined difference of the speeds of rolling wheels which correspond to predetermined deceleration/acceleration thereof, and to switch over to a lower threshold level when the predetermined decelerations/accelerations are exceeded. Suitable limit values are, for example, ±0.15 g. In this arrangement, the different speeds of the wheels when the wheels are operating in a curve are utilized; interferences which are specific to one side of the vehicle are filtered out.

DRAWINGS

DETAILED DESCRIPTION

Figure 1:
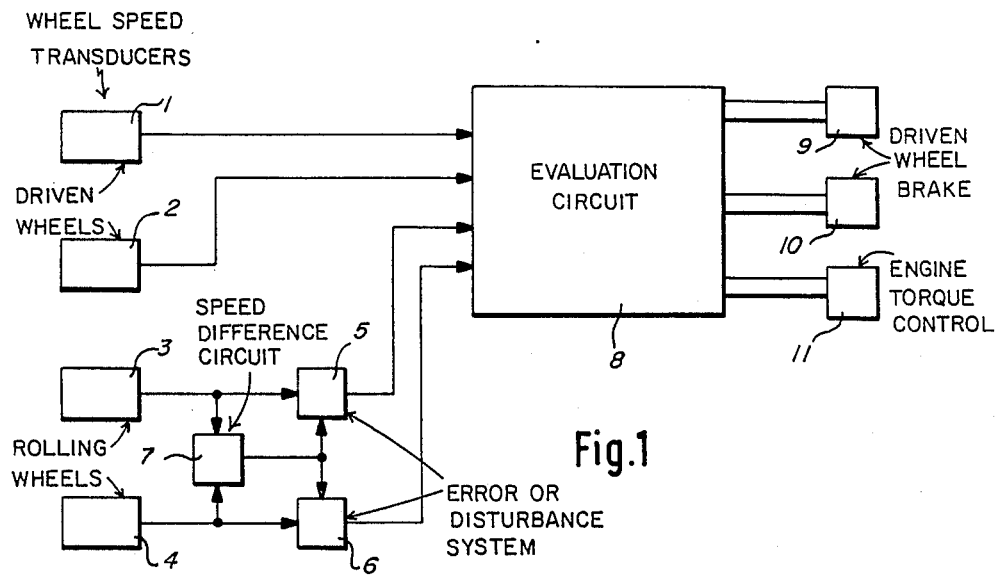
FIG. 1 is a block circuit diagram of a control system.

Referring first to FIG. 1: Blocks 1, 2, 3, 4, schematically, illustrate transducers which provide signals representative of the operating speed of four wheels of a vehicle. The wheels and the vehicle are not shown. The transducers 1, 2 are coupled to the driven wheels; the transducers 3, 4 are coupled to the non-driven or rolling wheels of the vehicle. The signals representative of wheel speed of the respective wheels are conducted to an evaluation circuit 8. Such evaluation circuits are known and standard in the wheel slip field. The evaluation circuit 8 receives the respective wheel speed signals and provides, at its output, slip signals which, upon exceeding a predetermined threshold, form control signals which, respectively, increase or decreasing braking pressure on the associated brakes of the respective wheels by controlling respective control elements or positioning elements 9, 10. Additionally, the evaluation circuit 8 provides control signals which can change the engine torque by controlling a engine torque control element 11, for example when both driven wheels, to which wheel speed transducers 1, 2 are coupled, have a tendency to slip.

The rolling wheel transducers 3, 4 provide output values in form of digital signals.

In accordance with the present invention, an error or disturbance removal system, schematically shown as blocks 5 and 6, is connected between the outputs from the transducers 3, 4 and the evaluation circuit 8, which has the effect of filtering and removing errors or disturbance signals. Additionally, block 7 is provided in which the difference of the speeds of the rolling wheels is determined and, if the difference exceeds a predetermined value of the speeds of the wheels to which the wheel speed transducers are coupled, an output signal is generated which is coupled to and connected to the error or disturbance removal systems 5, 6.

Figure 2:
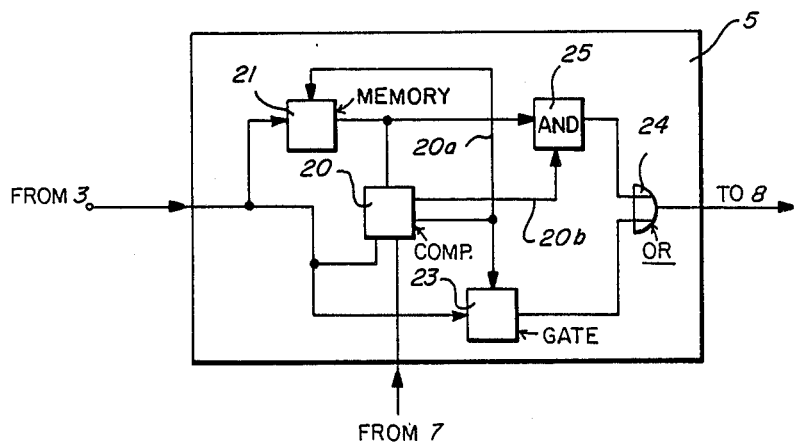
FIG. 2 is a detail embodiment of one of the blocks of FIG. 1.

FIG. 2 illustrates the details of the error or disturbance removal system 5. A digital speed signal, derived from transducer 3, is supplied to a comparator 20 which compares the digital value with a digital value of a prior measurement, and stored in a memory 21. If the difference is below a threshold or limit value, which corresponds, for example, to a deceleration of 0.3 g and an acceleration of +0.6 g, comparator 20 provides a signal on line 20a to a gate 23 which, in turn, transmits the signal to a further OR-gate 24 to provide a signal to the evaluation circuit 8 to measure if slip or tendency to slip occurs. Further, the signal from the comparator 20 is applied to the memory 21, which is updated by the signal from comparator 20.

If, however, the comparator 20 determines that the signal derived from the transducer 3 exceeds the above-given threshold or limit value, an output is derived from signal line 20b which is conducted to a gate 25. Gate 25 receives the signal from the memory 21 of a preceding measured value which, then, would correspond to a possible value; that one is then provided to the evaluation circuit 8 via OR-gate 24. The same value remains in memory 21.

If a predetermined speed difference is determined in the speed difference circuit 7, the so generated speed difference is applied to the comparator 20 and, if the speed difference exceeds a set value, changes the threshold of the comparator 20 to lesser threshold levels, for example to values which correspond to ±0.15 g.

Figure 3:
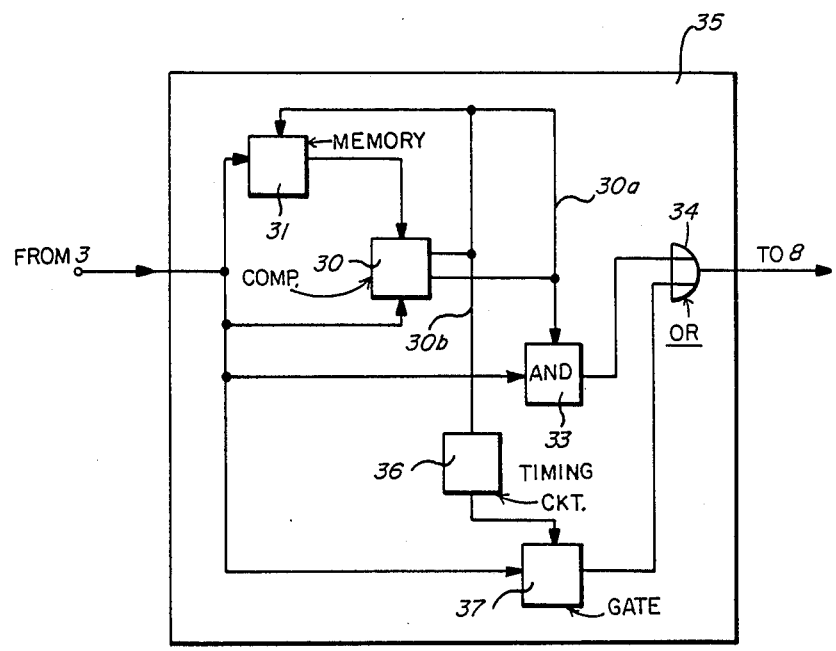
FIG. 3 is a modification of the circuit of FIG. 2.

Embodiment of FIG. 3: Comparator 30, memory 31 and gate 33, corresponding, respectively, to comparator 20, memory 21 and gate 23 of FIG. 2, supervise the circuit and provide the then pertaining instantaneous value through the OR-gate 34 to the circuit 8. If, however, the comparator 30 determines that the comparison threshold is exceeded, output line 30b sets a timing circuit 36 which, only after a predetermined time of, for example, 300 msec, opens a gate 37 so that the measured signal from the transducer 3 can be passed to the evaluation circuit only after the set time delay. Storage of proper signals, as well as of signals which exceed the comparison thresholds of comparator 30 are stored in the memory without delay.

Figure 4:
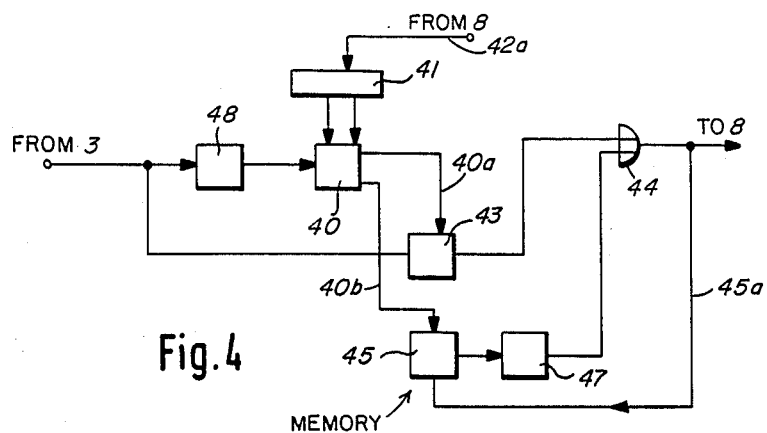
FIG. 4 is another block diagram showing another modification of the structure of FIG. 2.

FIG. 4 shows another alternative way to obtain a disturbance signal. The digital signal from the wheel speed sensor 3 is applied to a differentiator circuit 48, and the differentiated acceleration or deceleration signal is applied to a comparator 40. Comparator 40 receives comparison values from a memory 41, for example +1 g and −1 g, if the wheel is braked and a deceleration comparison value of −0.3 g if the wheel is unbraked. The switch-over between the respective values is controlled by a signal on line 42a derived from evaluation circuit 8, which provides an output signal if the wheel is braked, see FIG. 1, signal from evaluation circuit 8 to driven wheel brakes 9 and 10. If the rate of speed change, either positive or negative - acceleration or deceleration - is below the respective limiting values, the gate 43 is enabled via line 40a and the OR-gate 44 transfers the signal to the evaluation circuit 8. A disturbance is indicated if the reference values are exceeded. In that case, a reference value of a prior sensing cycle stored in a memory 45 is obtained. The value from memory 45, which has received the prior value via line 45a, is modified by a percentage addition or subtraction in a modifying unit 47 depending on whether a deceleration or an acceleration was sensed, and the modified value is applied to the evaluation circuit 8 through the OR-gate 44.

Figure 5:
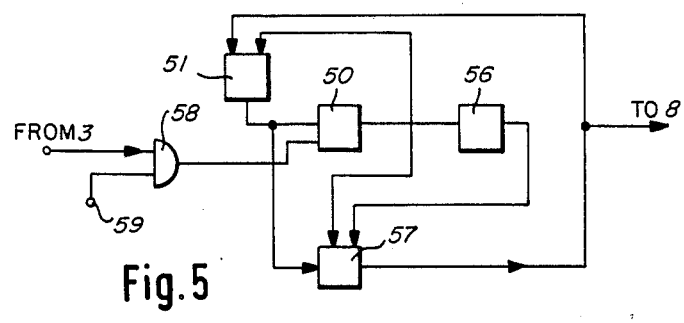
FIG. 5 illustrates an arrangement in which an anti-slip signal is filtered.
Figure 6:
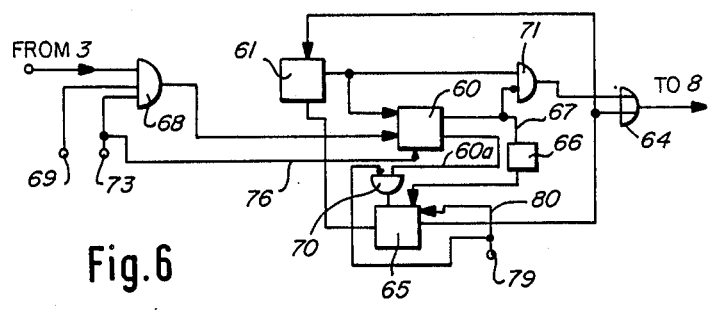
FIG. 6 is a system in which the threshold level of a reference signal is changed.

There are other possibilities of modifying the reference signals; FIGS. 5 and 6 illustrate two such systems.

Under ordinary conditions, the vehicle will not decelerate while a drive slip regulation is in effect. Thus, blocking a speed averaging circuit in a downward direction, for a short period of time, does not interfere with stability. On the contrary, it improves traction under drive slip regulation conditions. This is a specific advantage if the vehicle operates in deep or loose powder snow, on beaches, other sandy surfaces or the like, since it is possible that in front of the rolling wheels a wedge of snow, sand, or other loose particles may build up, and the rolling wheels thus, for a short period of time, will decrease speed. The negative approach of the speed signal or of the rolling wheels during drive slip regulation is thus filtered for a certain time T with a factor of $-a_1$. After the elapse of the time T, filtering is carried out with a factor of $-a_2$. Suitable values for the time and the filtering constants are:

T: 2.4 sec $-a_1$: 0.08 g $-a_2$: 0.34 g.

FIG. 5 shows the system which can carry out this concept. The digitally obtained wheel speed, from the transducer 3, is applied to the AND-gate 58. A terminal 59 enables the AND-gate if the drive slip control system is operative. The output from the AND-gate is applied to the comparator 50 which compares the rolling wheel speed with a reference value obtained from memory 51. If the comparator 50 determines that the speeds which are being compared are decreasing, that is, a deceleration of the vehicle, a signal is obtained which controls a decrease-proportioning circuit 57 which permits application to evaluation circuit 8 of the value stored in the memory 51 in a preceding cycle only when modified by a predetermined percentage modification, which percentage corresponds to decrease of the deceleration $-a_1$. This new reference speed is again stored in the memory 51. Only when the output signal of the comparator 50 has exceeded the time duration T, provides timing circuit 56 a signal to the decrease-proportioning circuit 57 which causes this circuit to further decrease the value in memory 51 which corresponds to the deceleration $-a_2$.

Further improvement of traction, particularly under deep-snow condition, for example when using chains, can be obtained by the system illustrated in FIG. 6.

The negative approximation is blocked without time limit, until a difference ΔV of, for example, about 5 km/h (approximately 3 mph) between the filtered and unfiltered measured speed of the rolling wheel or wheels has been reached. The filtered speed is not matched to a low value, and the unfiltered speed is the actual speed measured on the rolling wheels, from which the difference is determined. Thereafter, the system will operate essentially as described above, without, however, the time constraint. This arrangement is suitable for low speed ranges, for example between 0 to about 20 km/h (roughly 12 mph). Above 20 km/h, stability would be impaired. Upon starting, or operating the vehicle in deep snow, the above algorithm will result in a raised slip value up to ΔV; the filtered reference speed, at least in part, will be above the actual vehicle speed $V_F$.

In accordance with further optimization, the ΔV threshold can be made dependent on vehicle speed $V_F$. For example: the ΔV threshold can drop linearly between the speeds of $V_F=0$ km/h to $V_F=75$ km/h from ΔV=8 km/h to Δv=0 km/h. In addition, or as an alternative, above a ΔV threshold, a negative approximation of 0.08 g may be permitted for, for example, 0.5 second; thereafter, the above-described approximation block can be made effective. This permits slight but necessary matching of speeds if the vehicle operates in a curve.

Further, alternatively, or in addition, if a curved path of the vehicle is definitely recognized, for example obtained from the difference of unfiltered wheel speeds, the negative speed approximation is not blocked but, rather, permitted to drop off with a small negative slope of, for example, 0.08 g.

Referring now to FIG. 6: The wheel speed from the transducer 3 is applied over an AND-gate 68 to a comparator 60 if the drive slip controller is effective, as indicated by a signal on terminal 69. The wheel speed is compared in comparator 60 with a stored reference speed stored in memory 61. A vehicle speed signal is applied to the AND-gate 68 at a terminal 73, and opens the AND-gate 68 only if the vehicle speed is less than a low speed, for example 20 km/h.

When the wheel speed is not less than the reference speed by the value ΔV of, for example, 5 km/h, a signal is applied to a proportioning and blocking circuit 65 from the comparator 60, via line 60a, to block circuit 65. The previously stored reference speed, stored in the memory 61, will be transferred to the evaluation circuit 8 via the AND-gate 71 and OR-gate 64. When the speed difference ΔV is reached, the signal on line 67 applied to the proportioning and blocking circuit 65 will switch over circuit 65 to a proportioning portion, which permits passage of the stored signal but only to a decreased extent, which corresponds to a deceleration of, for example, −0.3 g. The threshold ΔV can be made dependent on vehicle speed by feeding the vehicle speed signal from terminal 73 through line 76 to the comparator 60. The line 67, which carries the signal from the comparator 60, is connected through a timing circuit 66, which limits the signal which switches over the proportioning and blocking circuit 65 to a predetermined time period T. If a curved path is recognized—obtained in well known manner, for example from deflection of the steering wheel or difference between wheel speeds at the right and left side of a vehicle—a signal on terminal 79 will be derived which, via an AND-gate 70, inhibits blocking of the circuit 65. The blocking gate 65 can then permit a gradual approximation, that is, with a low negative slope under control of line 80.

The various circuits of FIGS. 2 through 6 have been described in connection with the transducer 3 and error disturbance system block 5 of FIG. 1. Identical circuits can be used for the system 6, connected to transducer 4. The circuits of systems 5, 6 of course should be the same so that both wheels will react similarly; a single circuit can be used in time multiplex if it is capable of rapidly processing the respective signals.

The timing circuit 66 can be omitted if the timing constant selected is zero.

We claim:
1. A method of controlling slipping or spinning of a wheel of a vehicle, wherein the vehicle has
    driven wheels and non-driven or rolling wheels, and
    a slip control system for the driven wheels,
    comprising the steps of
    sensing if a respective driven wheel slips or spins above a predetermined slip level, or rotates under conditions indicating a tendency to slip or spin above said predetermined slip level;
    monitoring the speed of at least one of the rolling wheels and deriving rolling wheel output signals representative of said monitored speed;
    sensing the speed of at least one driven wheel and deriving driven wheel output signals representative of said sensed speed;
    generating a reference parameter signal representative of the speed of the at least one rolling wheel;
    comparing the driven wheel output signals with the reference parameter and deriving a comparison signal indicative of slip or incipient slip;
    decreasing the speed of rotation of said respective driven wheel when said comparison signal representative of slip indicates wheel slip above said predetermined slip level;
    in successive time steps, testing the rolling wheel output signals representative of the speed of the rolling wheel to determine if the signal has a characteristic indicative of change of speed of the rolling wheel which is not physically possible, and
    if the test indicates a condition of the signal representative of a physically impossible condition,
    generating, as the comparison signal, a new signal which is representative of at least a lesser change of speed than the rolling wheel output signal representative of said monitored speed.

2. The method of claim 1, wherein the step of testing the signal to determine if the signal has characteristics indicative of a physically impossible condition comprises
    monitoring temporally sequential signals, and determining if the second subsequent signal exceeds a threshold or limit value.

3. The method of claim 2, wherein the step of obtaining the reference parameter comprises
    determining the speed of two rolling wheels;
    determining the difference in speed between said two rolling wheels and obtaining a rolling wheel speed difference signal;
    and wherein said modifying step comprises decreasing the limit or threshold value if the rolling speed difference signal indicates a speed difference of the rolling wheels in excess of a predetermined value.

4. The method of claim 3, wherein the threshold or limit value, as modified, is approximately 0.15 g.

5. The method of claim 1, wherein said testing step comprises
    monitoring the speed of the rolling wheel and determining if the wheel has a rate of change of speed in positive or negative direction which exceeds a threshold or limit value.

6. The method of claim 3, wherein, if the rolling wheel is unbraked, said threshold value of a physically impossible condition is approximately −0.3 g.

7. The method of claim 1, wherein, if the rolling wheel is braked, said threshold value indicative of a physically impossible condition is approximately ±1 g.

8. The method of claim 1, including the step of storing the comparison signal;
and wherein, upon determining that a comparison signal is representative of a physically impossible condition, a stored prior comparison signal is subsequently utilized as the comparison signal.

9. The method of claim 1, including the step of storing a comparison signal;
and wherein, upon determining that a subsequent comparison signal is representative of a physically impossible condition, the prior, stored comparison signal is recalled and modified and, as so modified, utilized as the comparison signal.

10. The method of claim 1, wherein (FIG. 3) the step of modifying said comparison signal comprises
establishing a time interval;
and blocking application of said comparison signal for the time duration of said time interval.

11. The method of claim 1, wherein the step of generating the new signal comprises
sensing the driven wheel speed (V);
approximating the reference parameter to be representative of a theoretical speed condition of the vehicle, corresponding to deceleration of the vehicle;
comparing the approximate reference parameter and the driven wheel speed and determining if a predetermined difference ($\Delta V$) between the sensed wheel speed and the approximated reference parameter exists;
and, if said predetermined difference exists, modifying the approximate reference parameter by decreasing said approximate reference parameter at a predetermined negative rate.

12. The method of claim 11, comprising the steps of operating the method of claim 11 in control cycles; and
wherein the step of approximating the reference parameter comprises
storing an actual reference speed of a prior control cycle, and utilizing said stored reference parameter as the reference speed in a subsequent cycle.

13. The method of claim 11, comprising the step of operating the method of claim 11 in control cycles; and
wherein the step of utilizing said reference parameter comprises storing an actual reference speed of a prior control cycle and utilizing said stored reference speed, decreased at a slow negative rate, as the reference parameter in a subsequent cycle; and
if the comparison step has determined that said predetermined difference exists, decreasing the reference parameter at a faster negative rate.

14. The method of claim 11, comprising the steps of approximating the reference parameter to a theoretical vehicle speed condition, in decreasing direction
(a) in accordance with a slowly decreasing time function having gradually decreasing slope, and corresponding to only little vehicle deceleration, for a predetermined time duration T, and
(b) said time duration in accordance with a maximum negative slope corresponding to vehicle deceleration of about −0.3 g maximum.

15. The method of claim 11, including the step of determining if the vehicle speed (V) exceeds a predetermined value;
and carrying out the steps of claim 13 only if the vehicle speed is below said predetermined value.

16. The method of claim 11, including the step of modifying the predetermined difference ($\Delta V$) by decreasing the value of the predetermined difference at which the approximate reference parameter is modified with increase of vehicle speed.

17. The method of claim 11, including the step of determining a time interval, and carrying out said step of decreasing the stored reference parameter at the slow negative rate only for said predetermined time interval and, thereafter, blocking further decrease at said slow negative rate.

18. The method of claim 11, including the step of determining if the vehicle operates in a curved path;
and, if a curved path is determined, utilizing said stored reference parameter, decreased, at said slow negative rate.

19. The method of claim 1, wherein said steps of deriving rolling wheel output signals and driven wheel output signals comprise deriving said rolling wheel and driven wheel output signals in digital signal form.

20. Method of controlling slipping or spinning of a wheel of a vehicle, wherein the vehicle has driven wheels and non-driven or rolling wheels,
and a slip control system for the driven wheels,
sensing if a respective driven wheel slips or spins, or rotates under conditions indicating a tendency to slip or spin;
monitoring the speed of at least one of the rolling wheels and deriving an output signal representative of said monitored speed;
and decreasing the speed of rotation of said respective driven wheel, including comparing the speed of at least one of the driven wheels and a reference parameter which includes a value representative of the speed of at least one of the rolling wheels, and deriving a comparison signal,
comprising, in accordance with the invention, the steps of
approximating the reference speed to a theoretical vehicle speed condition, in decreasing direction
(a) in accordance with a slowly decreasing time function having gradually decreasing slope, and corresponding to only little vehicle deceleration, for a predetermined time duration T, and
(b) after said time duration T, in accordance with a maximum negative slope corresponding to vehicle deceleration of about −0.3 g maximum.

21. The method of claim 20, wherein said time duration T is in the order of about 2 seconds.

* * * * *